(12) United States Patent
Dorner et al.

(10) Patent No.: US 9,177,391 B1
(45) Date of Patent: Nov. 3, 2015

(54) IMAGE-BASED COLOR PALETTE GENERATION

(71) Applicant: Amazon Technologies, Inc., Reno, NV (US)

(72) Inventors: Charles Shearer Dorner, Seattle, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/316,528

(22) Filed: Jun. 26, 2014

(51) Int. Cl.
*G06K 9/00* (2006.01)
*G06K 9/36* (2006.01)
*G09G 5/02* (2006.01)
*G06T 7/40* (2006.01)
*H04N 1/64* (2006.01)

(52) U.S. Cl.
CPC .............. *G06T 7/408* (2013.01); *H04N 1/644* (2013.01)

(58) Field of Classification Search
CPC .................. H04N 1/644; G06T 7/408; G06T 2207/10024; G06Q 30/0203
USPC .................................... 382/162, 166; 345/601
See application file for complete search history.

(56) References Cited

U.S. PATENT DOCUMENTS

| | | | |
|---|---|---|---|
| 5,508,718 A * | 4/1996 | Haikin ............................ | 345/601 |
| 2001/0028464 A1 * | 10/2001 | Aritomi .......................... | 358/1.9 |
| 2002/0080153 A1 * | 6/2002 | Zhao et al. ..................... | 345/700 |
| 2003/0011612 A1 * | 1/2003 | Luo et al. ....................... | 345/589 |
| 2010/0053201 A1 * | 3/2010 | Klassen et al. ................. | 345/601 |
| 2012/0045121 A1 * | 2/2012 | Youngman et al. ............ | 382/162 |
| 2013/0050238 A1 * | 2/2013 | Bergou et al. .................. | 345/589 |

OTHER PUBLICATIONS

Montagne et al. ("Adaptive color quantization using the baker's transformation," J. Electronic Imaging 15(2), Apr. 2006).*
Yu et al. ("Contextual algorithm for color quantization," J. Electronic Imaging 12(3), Jul. 2003).*
Periasamy et al. ("A Common Palette Creation Algorithm for Multiple Images with Transparency Information," IEEE 2009 Int'l Conf. on Advances in Computing, Control, and Telecommunication Technologies).*
Luo et al. ("Novel color palettization scheme for preserving important colors," Proc. SPIE. 5008, Color Imaging VIII: Processing, Hardcopy, and Applications, Jan. 20, 2003).*

* cited by examiner

*Primary Examiner* — Yubin Hung
(74) *Attorney, Agent, or Firm* — Knobbe Martens Olson & Bear LLP

(57) ABSTRACT

Systems and methods are provided for generating an image-based color palette based on a color image. A color palette can be a collection of representative colors each associated with a weight or other metadata. A color palette may be generated based on palette generation criteria, which may facilitate or control a palette generation process. Illustratively, the palette generation process may include image pre-processing, color distribution generation, representative color identification, palette candidate generation and palette determination. Representative colors with associated weight can be identified from a distribution of colors depicted by the color image, multiple palette candidates corresponding to the same color image can be generated based on various palette generation criteria, and a color palette can be identified therefrom.

20 Claims, 6 Drawing Sheets

IMAGE-BASED COLOR PALETTE GENERATION

BACKGROUND

In many computing-centric commerce models, consumers are able to efficiently view and purchase a wide variety of items over computer networks. In many scenarios, a particular network resource, such as a commerce network site, can present items associated with various colors or color schemes. Often, individual sellers can provide color-related information about the item for sale, such as one or more color images depicting the item, as well as corresponding color names or color scheme names.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
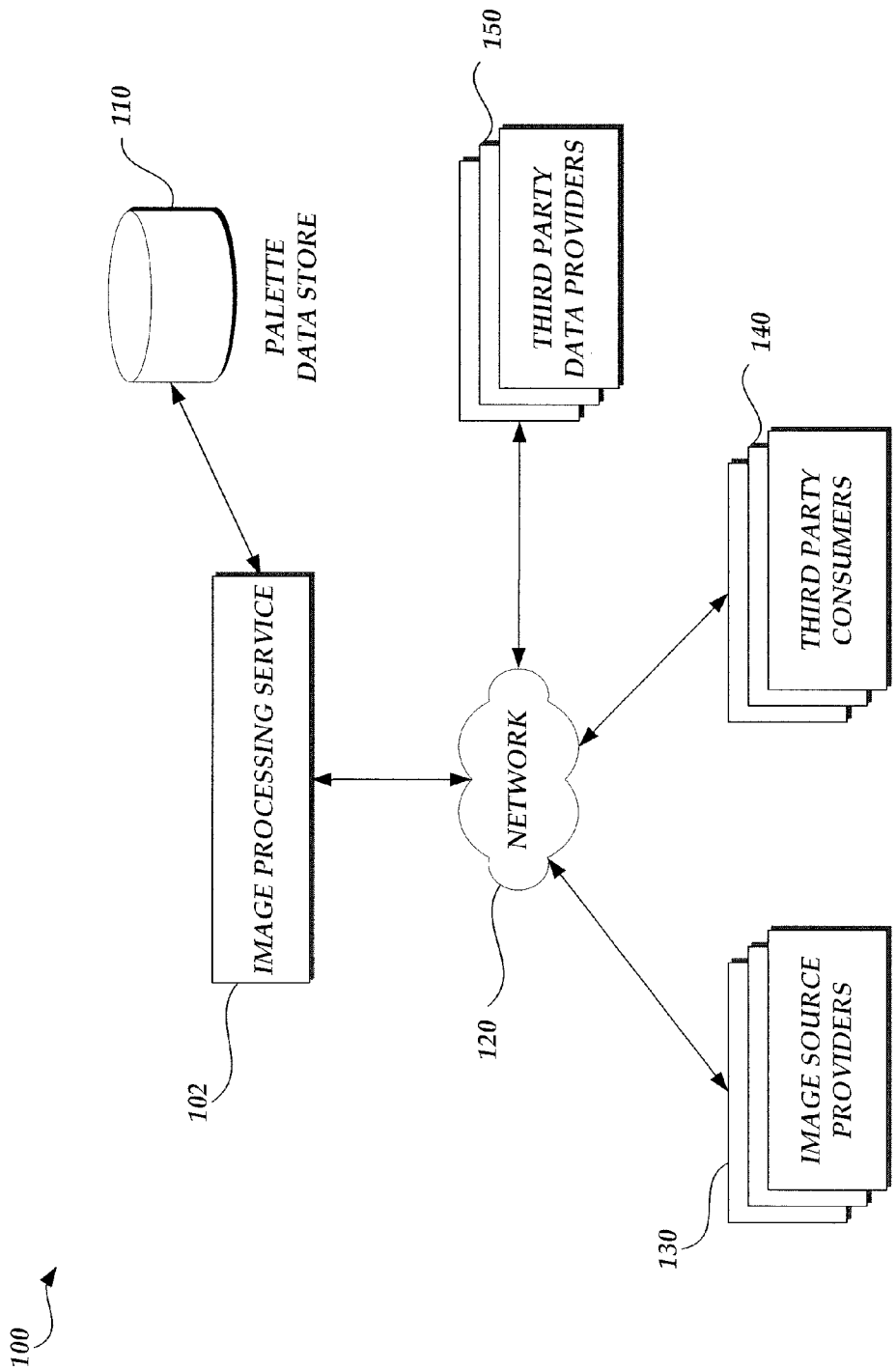
FIG. 1 is a block diagram illustrating one embodiment of an operating environment including an image processing service for palette generation based on color images.

Generally described, the present disclosure corresponds to methods and systems for color image processing. In many occasions, the host of a commerce or other network site, a merchandise provider or vendor utilizing the site, or a consumer visiting the site may wish to extract representative colors from color images to facilitate sales of items associated with various colors. For example, color matching items can be promoted for sale. Aspects of the present disclosure relate to generating color palettes, which are collections of representative colors each optionally associated with weight or other metadata, based on color images. Various factors can facilitate the generation of color palettes, for example, color standardization or binning, color distance formulae, popularity of colors or color palettes among a group of users, color identification algorithms, subjects depicted by color images or other related metadata.

In accordance with an illustrative embodiment, an image processing service obtains a color image depicting one or more items, a design, a scene, or the like, and generates one or more palettes based on palette generation criteria. The palette generation criteria can be input by a consumer, a host of a commerce or other network site, a merchandise provider or vendor, a designer, an artist, or the like. Alternatively, or in addition, the palette generation criteria can be automatically generated by a computing device or system. The palette generation criteria may indicate various preferences, factors, parameters, thresholds or requirements that facilitate or control a palette generation process.

Illustratively, the palette generation process may include various elements such as image pre-processing, color distribution generation, representative color identification, palette candidate generation, and palette determination. For example, the color image can be pre-processed prior to the generation of a color distribution or identification of representative colors. The pre-processing can include de-noising, normalization, down sampling, area-marking or the like. Illustratively, a color distribution can be generated based on color values corresponding to each pixel of the color image. Color standardization or binning can facilitate the generation of color distribution. Representative colors can then be identified based on the color distribution. For example, colors that are most distant from one another as measured by certain color distance formula(e) can be identified as representative colors. As another example, representative colors can be identified by taking into account color popularity information provided by third parties, such as color-related voting results provided by a social network site. One or more thresholds can be utilized in the identification of representative colors to facilitate color merging or weighting. A selection of the identified representative colors with associated weight or other metadata may constitute a palette candidate corresponding to specific threshold settings as indicated by palette generation criteria. In some embodiments, multiple palette candidates can be generated by changing the threshold settings. Eventually, a palette can be determined by examining one or more palette candidates. This determination can be achieved manually, for example, based on user preference or by user voting. This determination can also be achieved automatically as an optimization of a function between certain attributes of palette candidates and their corresponding settings of palette generation criteria.

Overview of an Example Embodiment

FIG. 1 illustrates an embodiment of an image processing environment 100 that can implement the features described herein in the context of an example image processing service 102. In some embodiments, the image processing environment 100 includes the image processing service 102, a palette data store 110, a network 120, image source providers 130 and third party consumers 140. In some embodiments, various components of the image processing environment 100 are communicatively interconnected with one another via the network 120. The image processing environment 100 may include different components, a greater or fewer number of components, and can be structured differently. For example, there can be more than one data store or other computing devices in connection with the image processing service 102. As another example, components of the image processing environment 100 may communicate with one another with or without the network 120.

The image processing service 102 can correspond to any system capable of performing the processes described herein. The image processing service 102 may be implemented by one or more computing devices. For example, the image processing service 102 may be implemented by computing devices that include one or more processors to execute one or more instructions stored in memory, and communication devices to transmit and receive data over the network 120. In some embodiments, the image processing service 102 is implemented on one or more backend servers capable of communicating over a network. In other embodiments, the image processing service 102 is implemented by one or more virtual machines in a hosted computing environment (e.g., a "cloud computing environment"). The hosted computing environment may include one or more provisioned and released computing resources, which computing resources may include computing, networking and/or storage devices.

In one aspect, the image processing service 102 can implement one or more applications that perform, individually or in combination, the image processing functions described herein, including image pre-processing, color distribution generation, representative color identification, palette candidate generation, palette determination, etc. In another aspect, the image processing service 102 may be configured to store or update palettes at the palette data store 110. In some embodiments, the image processing service 102 is associated with a network or network-based merchandise provider or vendor.

In the illustrated embodiment, the image processing service 102 may be communicatively connected to the palette data store 110. The palette data store 110 can generally include any repository, database or information storage system that can store palette data and associated metadata. The palette data stored in the palette data store 110 can be collections of colors, including collections of colors generated by a user and/or system based at least in part on human color preferences, with associated weight(s) and dates of creation(s). Palette data can be stored in various formats, such as lists, vectors, arrays, matrices, etc. Metadata can be associated with individual palettes, for purposes of indicating their format, semantics, features, conditions, sources, date of creation/editing, associated demographics (e.g., geographical region, age, gender, ethnic group, religion, etc. of users that provided input used in creating the palette), or the like. For example, metadata can link a palette to a corresponding color image from which the palette is derived. Alternatively, or in addition, metadata may indicate a category or a position in a taxonomy associated with the corresponding color image. As another example, metadata may indicate patterns, colocations, or other attributes of spatial distribution of palette colors within the corresponding color image. Illustratively, metadata may indicate whether palette colors appear adjacent to one another, whether palette colors are displayed in a scattered or concentrated form, whether the locations of areas showing palette colors are correlated or the like.

The network 120 may include any suitable combination of networking hardware and protocols necessary to establish communications within the image processing environment 100. For example, the network 120 may include private networks such as local area networks (LANs) or wide area networks (WANs), as well as public or private wired or wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) implemented by hardware that establishes networking links within the image processing environment 100. Additionally, the network 120 may implement one of various communication protocols for transmitting data between components of the image processing environment 100.

The image source providers 130 may correspond to hosts of a commerce or other network site, merchandise providers or vendors, designers, photographers, artists, social network sites, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Third party consumers 140 may correspond to visitors to a commerce or other network site, designers, architects, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Third party data providers 150 may correspond to any entity that provides information related to color, such as a social network site, a survey provider, a color statistics provider, a fashion information provider, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

One skilled in the relevant art will appreciate that the components and configurations provided in FIG. 1 are illustrative in nature. Accordingly, additional or alternative components and/or configurations, including the additional components, systems and subsystems for facilitating functions disclosed herein, may be utilized.

Figure 2:
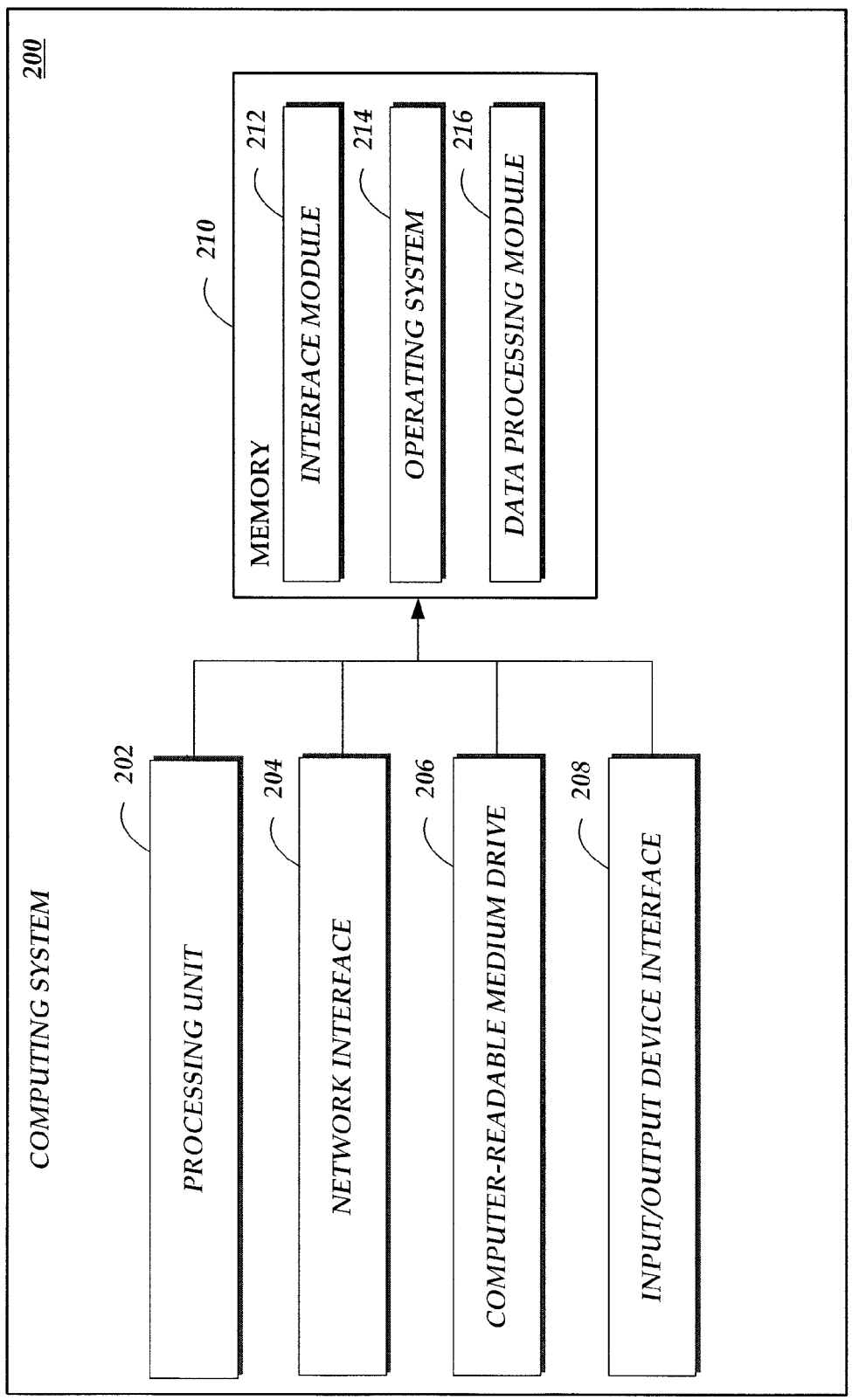
FIG. 2 is a block diagram illustrating an embodiment of example components of an image processing service utilized in accordance with the operating environment of FIG. 1.

FIG. 2 is a block diagram illustrating an embodiment of example components of a computing system 200 capable of implementing an image processing service 102 utilized in accordance with the image processing environment 100 of FIG. 1. The example computing system 200 includes an arrangement of computer hardware and software components that may be used to implement aspects of the present disclosure. Those skilled in the art will appreciate that the computing system 200 may include more (or fewer) components than those depicted in FIG. 2. It is not necessary, however, that all of these generally conventional components be shown in order to provide an enabling disclosure.

In the illustrated embodiment, the computing system 200 includes a processing unit 202, a network interface 204, a non-transitory computer-readable medium drive 206, and an input/output device interface 208, all of which may communicate with one another by way of a communication bus. The network interface 204 may provide the image processing service 102 with connectivity to one or more networks or computing systems. The processing unit 202 may thus receive information and instructions from other computing devices, systems or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the image processing service 102. The memory 210 may further include other information for implementing aspects of the present disclosure.

In one embodiment, the memory 210 includes an interface module 212. The interface module 212 can be configured to facilitate generating one or more user interfaces through which an image source provider 130, a third party consumer 140 or a third party data provider 150 utilizing a compatible computing device, may send to, or receive from, the image processing service 102 image data, palette data, instruction data, metadata, color popularity data, etc., or otherwise communicate with the image processing service 102. Specifically, the interface module 212 can be configured to facilitate image processing functions described herein, including obtaining images, marking areas within images, inputting palette generation criteria, selecting palettes and corresponding updates, etc. For example, an image source provider 130 or a third party consumer 140 may mark, label or otherwise indicate areas of interest in a color image, so that other parts of the image do not contribute to palette generation. This can be done via one or more generated user interfaces. The user interface can be implemented as a graphical user interface (GUI), network-based user interface, computer program, smartphone or tablet program or application, touchscreen, wearable computing device interface, command line interface, gesture, voice, or text interface, etc., or any combination thereof. Furthermore, the user interfaces can include indicators when an image has been processed, when a palette or palette candidate has been generated or selected, or the like.

In addition, the memory 210 may include a data processing module 216 that may be executed by the processing unit 202. In one embodiment, the data processing module 216 implements aspects of the present disclosure. For example, the data processing module 216 can be configured to process image data, instructions, palette data or metadata. Specifically, the data processing module 216 can be configured to perform image processing functions described herein, including image pre-processing, color distribution generation, representative color identification, palette candidate generation, palette determination, etc.

The image data processed by data processing module 216 can be of various formats. For example, the image data can correspond to an equation or table mapping illumination to x-y coordinates, a pixelized image, or other formats. In one embodiment, a color image is represented by a number of pixels organized in a two-dimensional array. The pixels can be associated with a value, which can be a vector based on a primary color model (e.g., RGB) or a luminance-chrominance model (e.g., Y'UV, YUV, YCbCr or YPbPr).

It should be noted that the image processing service 102 may be implemented by some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the computing system 200 and its components can be implemented by network servers, application servers, database servers, combinations of the same, or the like, configured to facilitate data transmission to and from image source providers 130 or third party consumers 140, via network 120. Accordingly, the depictions of the modules are illustrative in nature.

Example Palette Generation Process

Figure 3:
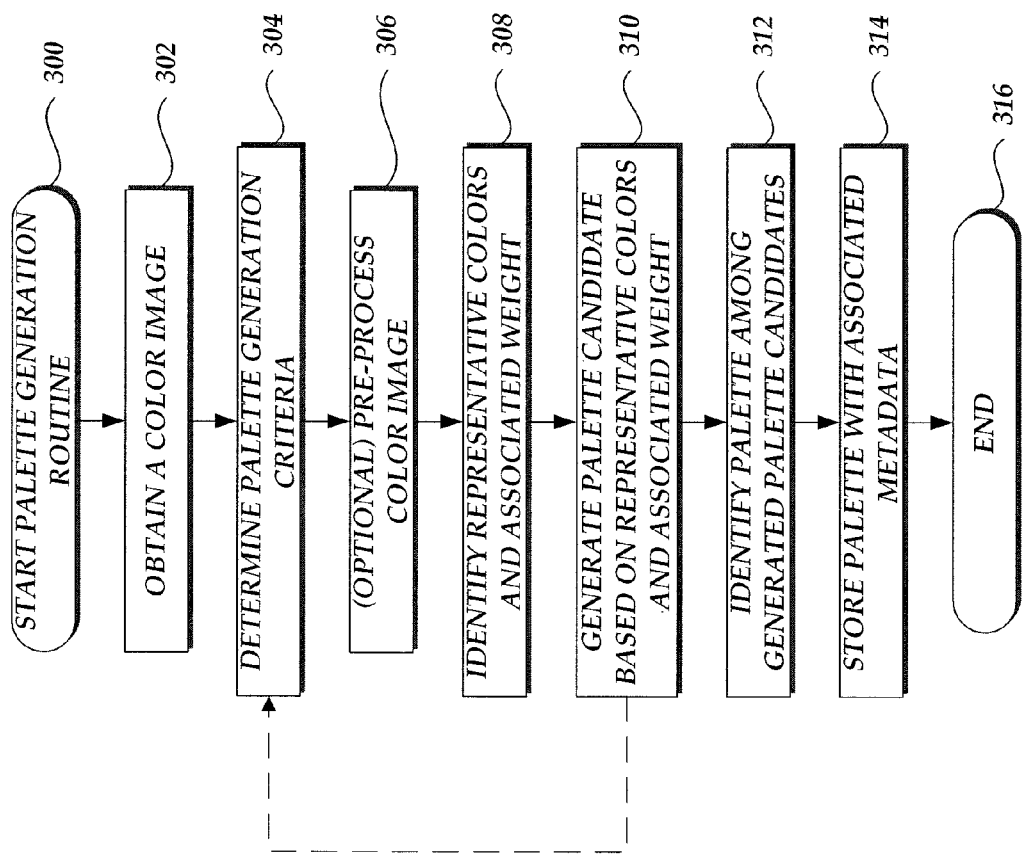
FIG. 3 is a flow diagram illustrating an embodiment of a palette generation routine implemented by an image processing service.

FIG. 3 is a flow diagram illustrating an embodiment of a palette generation routine 300 implemented by an image processing service 102. Routine 300 begins at block 302, where the image processing service 102 obtains a color image such as color image 600 illustrated in FIG. 6. The color image can depict one or more items, a design, a scene, a landscape or any other content of color. Obtaining the color image can be accomplished by receiving image data from image source providers 130 via their image data transmission to the image processing service 102. In one embodiment, images transmitted may be images designated for calibrating the image processing service 102. For example, images comprising specific scope or variance of colors may be used as the basis for a color space. In another embodiment, images transmitted may need to be manually, semi-manually, semi-automatically, or automatically assessed and filtered so as to only retain those relevant to a purpose of the palette to be generated.

Metadata associated with the color image can also be obtained. The metadata may include information corresponding to the colors, color scheme, lighting source, lighting direction or other factors regarding the color rendering of the image. The metadata may also include information about the currently obtained color images, other color images, subjects or category of subjects depicted, sources contributing to the image, or their interrelations. The metadata can further include any other information associated with the color image as can be envisioned by a person of skill in the art.

At block 304, palette generation criteria are determined. As described earlier, the palette generation criteria can be input by an image source provider 130 or a third party consumer 140, who may correspond to a host of a commerce network site, a merchandise provider or vendor, a visitor to the commerce network site, a designer, an artist, an architect, or the like. Alternatively, or in addition, the palette generation criteria can be automatically generated by the image processing service 102, or another computing device or system. For example, features or patterns exhibited by the color image as well as associated metadata can be considered by an automated process to determine the palette generation criteria.

The palette generation criteria may indicate various preferences, factors, parameters, thresholds or requirements that facilitate or control the palette generation routine 300, or its subroutines. For example, the palette generation criteria may indicate a computational method for pre-processing the obtained color image, for generating a color distribution, for identifying representative colors, for generating palette candidates, or for determining a palette. The palette generation criteria may also indicate parameters, thresholds, restraints, formula(e), or other factors that may inform various computational methods applicable to routine 300 or subroutines that it may invoke. For example, the palette generation criteria can identify a color distance formula or can include one or more thresholds of color distance for merging similar colors when representative colors are identified from a color image.

In some embodiments, the obtained color image is pre-processed at block 306. For example, the color image may be converted to a format compatible with the palette generation routine 300 or its subroutines. The color image may also be classified or prioritized based on applicable metadata. Further, pre-processing can include noise removal, rotation, re-orientation, normalization in shape, size, resolution or color or other manipulations to facilitate relevant processes and methods.

Still further, pre-processing may include area marking or labeling within the color image. For example, various contour matching algorithms can be employed to mark out an area of interest. Alternatively, or in addition, areas of interest can be manually marked out. In some embodiments, a background, such as area 602 of color image 600, can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, or to disambiguate to a greater or lesser extent. Information corresponding to pre-processing can be included in corresponding metadata that is associated with the color image, which can facilitate palette generation.

Figure 4:
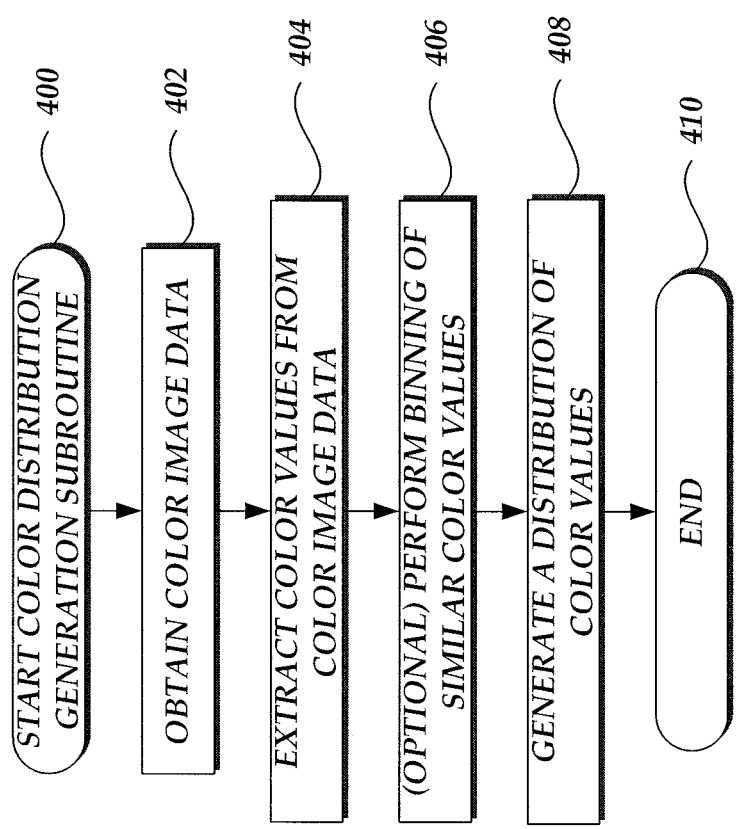
FIG. 4 is a flow diagram illustrating an embodiment of a color distribution generation subroutine implemented by an image processing service.
Figure 5:
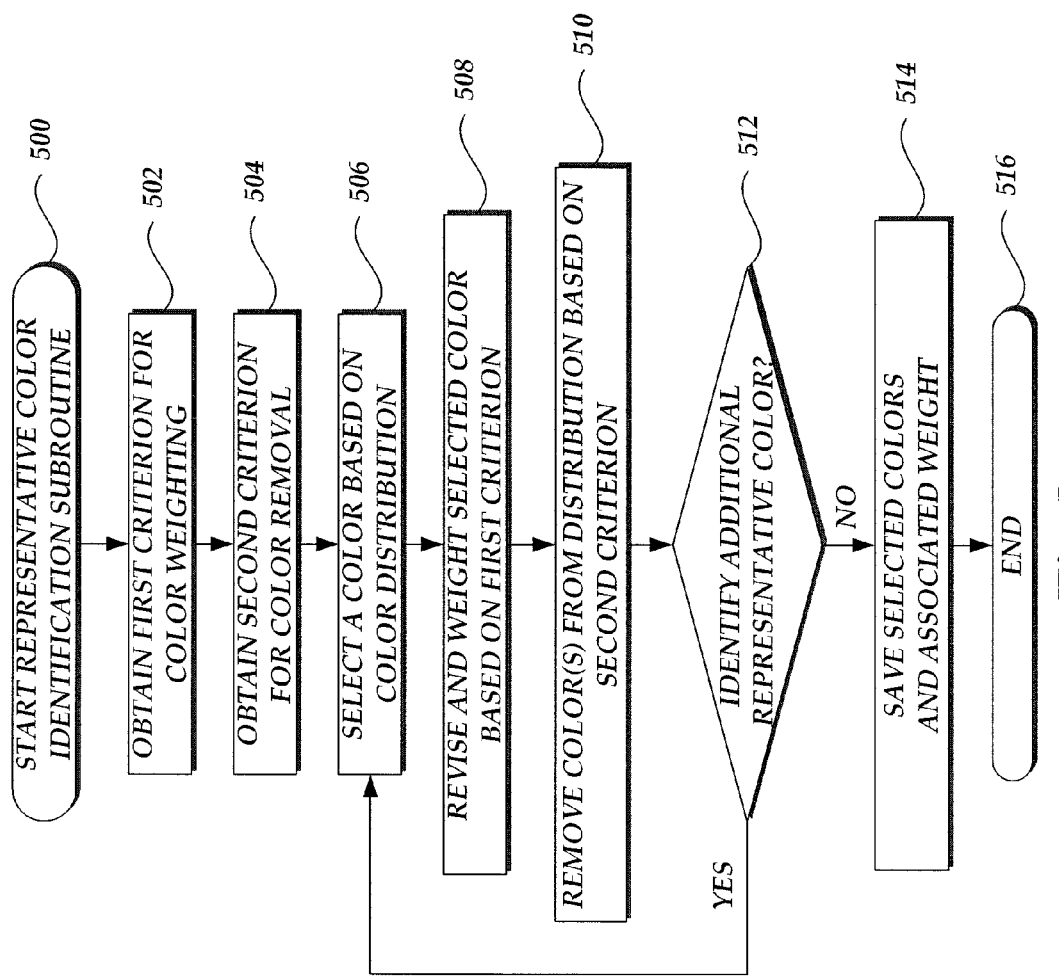
FIG. 5 is a flow diagram illustrating an embodiment of a representative color identification subroutine implemented by an image processing service.

At block 308, representative colors and their associated weight are identified from the obtained color image. The identification of representative colors may include multiple subroutines or sub-elements. Various image processing or clustering algorithms can be employed to achieve this. In some embodiments, a color distribution, such as a histogram illustrating distinct colors with their corresponding weight, is generated based on the color image. For example, the color distribution can be generated by invoking a subroutine as illustrated in FIG. 4 and as will be further described below. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution, for example, by invoking a subroutine as illustrated in FIG. 5 and further described below. The identification of representative colors can be facilitated or controlled by information included in the palette generation criteria or the metadata associated with the color image.

At block 310, a palette candidate is generated to include at least a subset of the identified representative colors and their associated weight. The palette candidate may further include metadata associated with the identified representative colors and weights.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, routine 300 can move back to block 304, where new palette generation criteria can be determined. Based on the new palette generation criteria, a new palette candidate can be generated.

At block 312, one or more palettes can be identified among previously generated palette candidate(s). In some embodiments, each generated palette candidate is automatically considered a final palette so additional identification is not required at block 312. In other embodiments, one or more palettes are identified among multiple palette candidates based on palette generation criteria that may indicate whether the identification should be performed manually or automatically, which attributes should be examined, what standards should be applied to the identification, or the like.

Identification of palettes can be accomplished manually or semi-manually. For example, by repeating the part of routine 300 from block 304 to block 310, a third party consumer 140 may experiment with various palette generation criteria settings that can lead to generation of multiple palette candidates. In other words, each generated palette candidate can correspond to a distinct setting of palette generation criteria. The third party consumer 140 may then select one or more of the candidates and label them as palettes associated with the color image. Alternatively, or in addition, the identification of palettes can be accomplished automatically or semi-automatically by the image processing service 102, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored, at block 314, at the palette data store 110, either by creating new data entries or updating existing palettes. Routine 300 then ends at block 316. Depending on relevant requirements or preferences indicated in the palette generation criteria corresponding to identified palettes, various metadata can be associated therewith, for purposes of indicating their format, semantics, features, conditions or the like. In some embodiments, metadata can link a palette to a corresponding color image from which the palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

Figure 6:
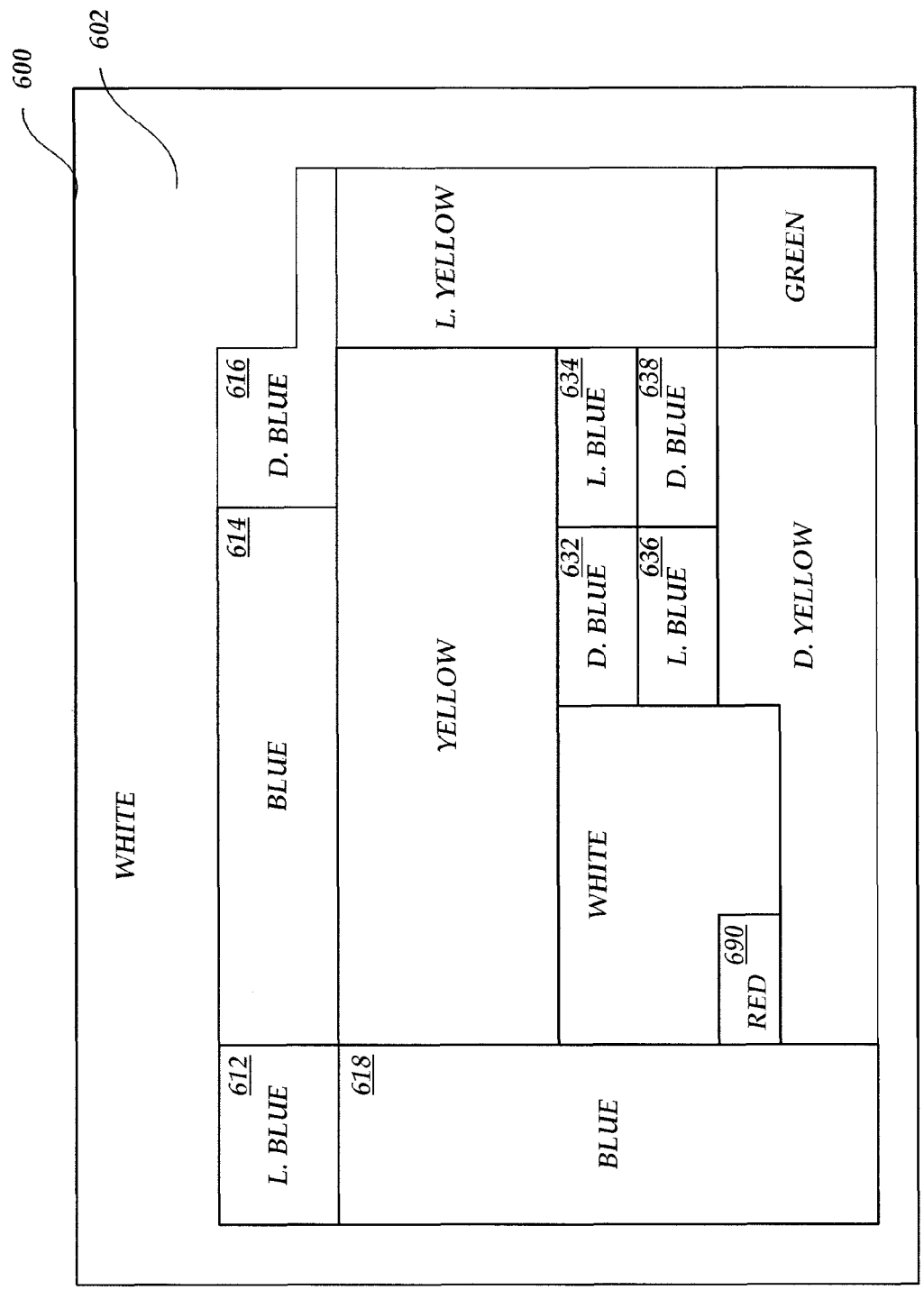
FIG. 6 is a simplified example of a color image depicting a plurality of colors.

For example, with reference to FIG. 6, assume a palette corresponding to a color image 600 includes palette colors BLUE, YELLOW, WHITE and GREEN. The metadata may indicate the position, spread and shape of these palette colors as they appear in relation to one another or in relation to the color image 600. As will also be explained in more detail in connection with FIG. 5, in some embodiments, palette color BLUE may be attributable to areas 612, 614, 616, 618, as well as areas 632, 634, 636 and 638 as shown in FIG. 6. Illustratively, the metadata may indicate that BLUE is depicted in two disjoint areas. The metadata may also indicate the relative size of the two areas, namely, combined areas 612, 614, 616 and 618 as compared to combined areas 632, 634, 636 and 638. In some embodiments, palette color BLUE may be attributable to areas 612, 614, 616 and 618 only. In these embodiments, the metadata may indicate that palette color BLUE does not correspond to areas 632, 634, 636 and 638. The metadata may further indicate a reason for excluding these areas, for example, due to certain pre-processing operations such as area-marking or labeling, due to spatial separation of colors as depicted in the color image 600, or the like.

Metadata associated with a palette can also include information derived from the metadata associated with a corresponding color image. As described earlier, such information may correspond to the colors, color scheme, lighting source, lighting direction or other factors regarding the color rendering of the image. The metadata may also include information about interrelations between, or among colors, color images, subjects or category of subjects depicted, sources contributing to the image, or any other information associated with the image. For example, the metadata may indicate whether a palette color represents that of a subject, background or foreground of the corresponding color image. Based on the palette data and associated metadata, the stored palettes can also be indexed, classified or clustered in various ways.

Metadata associated with a palette can further include information obtained from extrinsic sources that are related to the palette or one or more colors included in the palette. In some embodiments, color or palette trends can be determined based on voting or surveys of, for example, users of a social network site. The voting or survey results can be theme- or time-specific. For example, the voting or survey may be a survey of most popular colors for Spring 2014, a voting result of a most liked palette for interior design of Seattle area homes, etc. Such temporal or subject related information can be included in the metadata. Based on such information, the metadata may include further information derived therefrom. For example, if an existing palette has consistent connections to popular palettes or colors associated with different times, the existing palette may be labeled as a timeless palette.

Example Color Distribution Generation Process

FIG. 4 is a flow diagram illustrating an embodiment of a color distribution generation subroutine 400 implemented by an image processing service 102. Subroutine 400 begins at block 402, where color image data is obtained. The color image data can be a color image in its original format, a pre-processed color image, or other representation of color values with or without associated metadata, depending on the color distribution algorithm employed.

At block 404, color values are extracted from the color image data. Illustratively, if an original or pre-processed color image is obtained, color values can be extracted from each pixel of the image. In some embodiments, the color values are vectors in a color space as discussed earlier. For example, the color values can be vectors in an RGB, Y'UV, YUV, YCbCr or YPbPr based color space. The color values can also be represented or transformed into other mathematical formats, for example, based on various data compression techniques.

In other embodiments, the color values may include associated metadata values, such as coordinates of a pixel in a color image representing a corresponding color. In these embodiments, an illustrative color value can be a five-dimensional vector: the first three dimensions corresponding to the color and the remaining two dimensions corresponding to a location in the color image, such as x-y coordinates. In these embodiments, color values can be represented or transformed to other mathematical formats as well.

At block 406, similar color values can optionally be merged or binned in various ways. In some embodiments, one or more thresholds can be specified or automatically determined so that similar color values are binned. One or more color similarity measures (e.g., calculated based on a color distance formula, such as Euclidean distance in RGB based color space) can be used to quantify color similarity for the purpose of binning color values. For example, a plurality of standardized colors can be determined by the image processing service 102, as a basis for binning colors and generating a color distribution therefrom. Illustratively, the plurality of standardized colors can be X11 colors from the CSS3 specification or a set of Pantone colors. The plurality of standardized colors can be made consistent for a particular category of color image data, as a way to calibrate the color distribution generation process.

Each standardized color can be associated with a threshold. An extracted color value is placed in a bin corresponding to a distinct standardized color if a similarity measure of the two falls within the associated threshold. After binning, extracted color values are represented by their corresponding standardized colors. In this example, the plurality of standardized colors may or may not be uniformly distributed in a color space, and thresholds associated with individual standardized colors may or may not be the same. Illustratively, with reference to FIG. 6, a plurality of standardized colors for color image 600 can be {BLUE, YELLOW, RED}. After binning, LIGHT BLUE, DARK BLUE and GREEN may all be represented by BLUE as they are similar enough to BLUE. LIGHT YELLOW and WHITE may both be represented by YELLOW as they are similar enough to YELLOW. The binning process results in two heavy bins corresponding to the standardized colors BLUE and YELLOW and a light bin corresponding to the standardized color RED.

In some embodiments, extracted color values can be binned with one another if their respective similarity measure falls within a threshold, without referencing standardized colors. In this case, the binned color values can be represented by an average of individual bins.

At block 408, a distribution of color values is generated. For example, the distribution can be a histogram representing a number of pixels corresponding to distinct color values derived from the color image data, with or without binning. As another example, the distribution can be a percentage breakdown of distinct colors derived from the color image data, with or without binning. Subroutine 400 ends at block 410.

Example Representative Color Identification Process

FIG. 5 is a flow diagram illustrating an embodiment of a representative color identification subroutine 500 implemented by an image processing service 102. The flow diagram begins at block 502, where the image processing service 102 obtains a first criterion for weighting representative colors as they are identified. At block 504, the image processing service 102 obtains a second criterion for removing identified representative color(s) from a color distribution. The first or second criterion can be included in, or derived from, the palette generation criteria as described earlier. In some embodiments, the first and second criteria can be one or more thresholds of a color distance, or other similarity measures between, or among, color values. Illustratively, various color distance formula or models, such as CIEDE2000, CMC 1:c, or the like, can be utilized to compute color distance between colors.

In some embodiments, similarity measures that take into account both color and metadata components can be designed or adopted. Referencing again to FIG. 6 and taking color image 600 for example, the similarity of two specific colors can vary depending on the colocation or context of corresponding pixels. Illustratively, LIGHT BLUE as depicted by area 612 and DARK BLUE as depicted by area 616 may be considered sufficiently similar to BLUE as depicted by areas

614 and 618. In comparison, LIGHT BLUE as depicted by areas 634 or 636 or DARK BLUE as depicted by areas 632 or 638 may not be considered sufficiently similar to BLUE as depicted by areas 614 and 618 due to the spatial distance or connection of corresponding areas.

Referencing FIG. 5 at block 506, a color (as represented by a color value) is selected based on a color distribution. Illustratively, the color distribution can be generated by subroutine 400 as described above. Various methods can be adopted to select a color from the color distribution. In some embodiments, the color selection can be based on a dominance of colors in the color distribution. For example, the most dominant color of the color distribution can be selected. The most dominant color can be a distinct color accounting for the largest portion of the color distribution as compared to other distinct colors. In these embodiments, however, the most dominant color may initially stand for a background color. For example, the most dominant color may be similar enough to a background color indicated by metadata associated with the color image. Alternatively, or in addition, the most dominant color may be similar enough to a color depicted by the four corners of the color image, which may be considered a background color. In this case, the first selected color may not be considered a representative color and may not be subsequently saved for generating a palette candidate.

In some embodiments, one or more base colors (e.g., black, white, etc.) can be defined, and the first color selected from the color distribution can be a most distant color from the base color(s). One of relevant skill in the art can envision that different base colors may lead to different sets of subsequently identified representative colors, even for a same color distribution. Accordingly, in these embodiments, defining the base color(s) and applying the base color(s) consistently toward a category of color images (and their color distributions) may constitute one way to calibrate the palette generation process. The definition of the base color(s) can be indicated or derived from the palette generation criteria as described earlier.

In some embodiments, a most concentrated color of the color distribution can be selected. A concentration formula can be designed or adopted. For example, color values can be grouped using various clustering or grouping algorithms. Intra-group similarity measure, such as standard deviation of pairwise color distance, can be calculated. The group of colors whose constituents are most similar to one another can be picked, and a color representing the group can be determined and selected. In this example, the color selected can be an average color of the group based on certain color distance formula.

In other embodiments, a color can be selected based on color-related voting or surveys. A popularity of colors among a group of users can be obtained from one or more third party data providers 150 to facilitate the color selection. For example, a color in the color distribution that is most similar to a popular color as indicated by users of a social network site can be selected. In one embodiment, the popular color can be determined based on user votes on a variety of colors derived from the color distribution. In another embodiment, the popular color can be determined based on user votes on one or more colors that they think are most distinct from, or compatible with, one or more predetermined base colors. In this case, a predetermined base color can be a representative color that is already identified from the color distribution.

As another example, a popular color palette as indicated by users of a social network site can be obtained to facilitate the color selection. In this example, the color selected can be a color in the color distribution that is most similar to a specific color included in the popular color palette. In one embodiment, users of the social network site can vote on various existing color palettes. Existing color palettes can be classified based on their corresponding palette colors, associated weight and metadata to facilitate meaningful voting. In another embodiment, the color selected can be a color included in a popular color palette that also includes one or more predetermined base colors. In this case, a predetermined base color can be a representative color that is already identified from the color distribution.

As still another example, the color selected can be a popular color associated with a subject or category of subject as depicted by the color image corresponding to the color distribution. The popular color can also correspond to a specific date or time period. Illustratively, the color image can depict a mannequin wearing various clothing items. The color selected can be a popular fashion color of the current season as voted by users of a social network site.

In still other embodiments, a color can simply be manually picked or randomly selected from the color distribution. For example, the color can be manually picked based on a color name or color scheme that is associated with the color image forming the basis of the color distribution. Illustratively, a color scheme can indicate a choice of colors that correspond to a particular style or appeal. A color scheme may be associated with descriptive or suggestive names, such as sunset, tropical, nostalgia, etc. A color scheme may or may not correspond to a precise mapping to a set of colors. As described earlier, metadata such as colocations or connections between colors as they are visually depicted in a corresponding color image can be taken into account for computing color similarity measures for all these embodiments.

Referring again to FIG. 5, at block 508, the selected color is revised to be identified as a representative color and is weighted based on the first criterion. In some embodiments, the first criterion can include one or more thresholds for revising and weighting the selected color. For example, colors of the color distribution that are within a threshold distance from the selected color can be merged therewith and the selected color may be revised to reflect a color representing all merged colors. The representative color can be a function of all merged color values, such as their "center of mass" based on certain color distance formulae or a most frequent color of all merged colors. Accordingly, the representative color can be weighted based on the quantity of merged colors, such as, the number of pixels depicting any of the merged colors. Alternatively, the weight associated with the representative color can be a percentage for which the merged colors account in the color distribution or its variant.

Similarly, metadata such as colocations or connections between colors as they are visually depicted in a corresponding color image can be taken into account. Referencing again to FIG. 6 and taking color image 600 for example, suppose DARK BLUE as depicted by area 616 is the selected color. BLUE and LIGHT BLUE as depicted by areas 614, 612 and 618 may be merged with DARK BLUE of area 616, while DARK BLUE of areas 632, 638 and LIGHT BLUE of areas 634, 636 may not. Illustratively, the corresponding representative color becomes BLUE, as LIGHT BLUE of area 612 and DARK BLUE of area 616 cancel each other out when computing a "center of mass." Also, the weight associated with representative color BLUE excludes pixels of areas 632, 634, 636 and 638.

Referencing FIG. 5 at block 510, one or more colors are removed from the color distribution based on the second criterion to facilitate identification of additional representative colors. The color removal can be based on the currently identified representative color. In some embodiments, the second criterion can include one or more thresholds for color removal. For example, colors in the color distribution that are within a threshold distance from the currently identified representative color can be removed from the color distribution and will not be considered in further identification of additional representative colors. In other words, the color distribution is updated based on the second criterion to only retain colors that are dissimilar enough to the currently identified representative color. The one or more thresholds included in the second criterion may or may not be the same as those included in the first criterion.

Again, metadata such as colocations or connections between colors as they are visually depicted in a corresponding color image can be taken into account. Continuing the example above in connection with color image 600 of FIG. 6, illustratively the LIGHT BLUE, BLUE and DARK BLUE colors attributable to areas 612, 614, 616 and 618 are removed from the color distribution, while the LIGHT and DARK BLUEs attributable to areas 632, 634, 636 and 638 remain. As will be described in more detail below, LIGHT or DARK BLUEs attributable to areas 632, 634, 636 or 638 may be selected as a basis for identifying another representative color.

Returning to FIG. 5, at block 512, the image processing service 102 determines whether additional representative colors are to be identified. In some embodiments, the determination can be based on a limit on the number of representative colors. For example, the palette generation criteria may specify a fixed number or a maximum number of representative colors each palette candidate may include. In some embodiments, the determination can be based on the colors that remain in the color distribution. For example, the ratio of weight between the remaining colors and all colors in the original distribution can be monitored to facilitate this determination. Illustratively, if the remaining colors account for a small enough portion of the original color distribution (e.g., only RED as depicted in FIG. 6 by a small enough area 690 remains), then no more representative colors need to be identified. As another example, the similarity among remaining colors can be monitored to facilitate this determination. Illustratively, if the average pairwise color distance of remaining colors is small enough, the remaining colors can be merged to form a final representative color and weighted accordingly. In other embodiments, the determination can be based on identified representative colors. For example, the palette generation criteria may indicate ways to assess the weight distribution associated with identified representative colors. Illustratively, the skewness, divergence, or other measures of the weight distribution can be utilized to facilitate the determination.

If it is determined that additional representative colors need to be identified, subroutine 500 proceeds to block 506 where a next color is selected from the updated color distribution. In accordance with embodiments where a color is selected based on its distance from one or more base colors, the base colors are updated to reflect recently identified representative color(s). In other words, an identified representative color becomes one of the base colors in a subsequent iteration. For example, when subroutine 500 proceeds to block 506, the next color selected from an updated color distribution can be a color farthest away from one or more representative colors identified in previous iterations. As another example, the next color selected can be a color farthest away from a combination of all previously identified representative colors. If it is determined that further identification of representative colors is not needed, subroutine 500 proceeds to block 514.

At block 514, the identified representative colors and their associated weight are saved to create a palette candidate. Additionally, metadata can be associated therewith. For example, relative locations, subjects or items represented, distribution patterns, or the like, that are associated with identified representative colors can be saved and linked to respective representative colors. Subroutine 500 ends at block 516.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and algorithm steps described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for generating a color palette, the computer-implemented method comprising:
   under control of a hardware computing device configured with specific computer-executable instructions,
      obtaining a color image;
      obtaining a plurality of palette generation criteria applicable to generating a color palette, wherein the color palette is generated based, at least in part, on the color image;
      generating a plurality of palette candidates corresponding to the color image, wherein individual palette candidates of the plurality of palette candidates are generated based, at least in part, on distinct palette generation criteria of the plurality of palette generation criteria, wherein the individual palette candidates each include a plurality of palette colors derived from a plurality of representative colors associated with the color image;
      identifying a color palette from the plurality of palette candidates based, at least in part, on a relationship between an attribute associated with each of the plurality of palette candidates to a criterion of the plurality of palette generation criteria; and
      storing the identified color palette with associated metadata, wherein the associated metadata indicates a relationship between at least two palette colors of the plurality of palette colors as visually depicted in the color image.

2. The computer-implemented method of claim 1, wherein the metadata is associated with the identified color palette based, at least in part, on palette generation criteria corresponding to the identified color palette.

3. The computer-implemented method of claim 1, wherein the relationship between the at least two palette colors includes at least one of a colocation, shape, or spatial distribution of the at least two palette colors as visually depicted in the color image.

4. The computer-implemented method of claim 1, wherein the metadata further indicates a relationship between at least one palette color of the plurality of palette colors and the color image as to how the at least one palette color is visually depicted in the color image.

5. The computer-implemented method of claim 1, wherein the metadata includes information related to a subject depicted by the color image.

6. The computer-implemented method of claim 1, wherein the plurality of palette colors are derived from a plurality of representative colors based, at least in part, on a weight associated with each of individual representative colors of the plurality of representative colors.

7. The computer-implemented method of claim 6, wherein the attribute associated with each of the plurality of palette candidates includes at least one of a number of the one or more palette colors, a respective color value of the one or more palette colors, or a respective palette color weight associated with the one or more palette colors.

8. A system comprising:
   a non-transitory, computer-readable storage medium configured to store computer-executable instructions; and
   a hardware processor in communication with the data store, the hardware processor, configured to execute the computer-executable instructions to at least:
   generate a plurality of palette candidates corresponding to a color image depicting a set of colors, wherein individual palette candidates of the plurality of palette candidates are generated based, at least in part, on a distinct palette generation criterion from a plurality of palette generation criteria, and wherein individual palette candidates each include a plurality of palette colors derived from the color image;
   identify a color palette from the plurality of palette candidates based, at least in part, on a relationship between an attribute associated with each of the plurality of palette candidates to a corresponding distinct palette generation criterion of the plurality of palette generation criteria; and
   cause association of metadata with the identified color palette, wherein the metadata indicates a relationship between at least two palette colors of the plurality of palette colors as visually depicted in the color image.

9. The system of claim 8, wherein the plurality of palette colors are derived from the color image by selecting the plurality of palette colors from a plurality of representative colors identified from the color image.

10. The system of claim 9, wherein the plurality of representative colors are identified by selecting a subset of colors from the set of colors depicted by the color image based, at least in part, on one or more color distances associated with the subset of colors.

11. The system of claim 10, wherein the plurality of representative colors are identified by merging individual colors of the selected subset of colors with similar colors in the set of colors depicted by the color image, respectively.

12. The system of claim 8, wherein the metadata indicates at least one of a format, semantics, features, or conditions corresponding to the identified color palette.

13. The system of claim 8, wherein the metadata indicates spatial distribution of palette colors included in the identified color palette within the color image.

14. The system of claim 8, wherein the metadata indicates at least one of the color image, a category associated with the color image, or a position in a taxonomy associated with the color image.

15. A non-transitory computer-readable storage medium storing computer-executable instructions that when executed by a processor perform operations comprising:

generating a plurality of palette candidates corresponding to a color image depicting a set of colors, wherein individual palette candidates of the plurality of palette candidates are generated based, at least in part, on a distinct palette generation criterion from a plurality of palette generation criteria, and wherein individual palette candidates each include a plurality of palette colors derived from the color image;

identifying a color palette from the plurality of palette candidates based, at least in part, on a relationship between an attribute associated with each of the plurality of palette candidates to a corresponding distinct palette generation criterion of the plurality of palette generation criteria; and causing association of metadata with the identified color palette, wherein the metadata indicates a relationship between at least two palette colors of the plurality of palette colors as visually depicted in the color image.

16. The non-transitory computer-readable storage medium of claim 15, wherein the operations further comprise pre-processing the color image.

17. The non-transitory computer-readable storage medium of claim 16, wherein pre-processing the color image includes designating an area of interest in the color image, wherein the plurality of palette candidates are generated based, at least in part, on the area of interest.

18. The non-transitory computer-readable storage medium of claim 15, wherein the metadata includes information derived from second metadata associated with the color image.

19. The non-transitory computer-readable storage medium of claim 18, wherein the second metadata associated with the color image corresponds to one or more factors related to color rendering of the color image.

20. The non-transitory computer-readable storage medium of claim 18, wherein the second metadata associated with the color image corresponds to at least one of an interrelation among color images, a subject depicted by the color image, a category of subjects depicted by the color image, or a source contributing to the color image.

* * * * *